Patented Feb. 13, 1923.

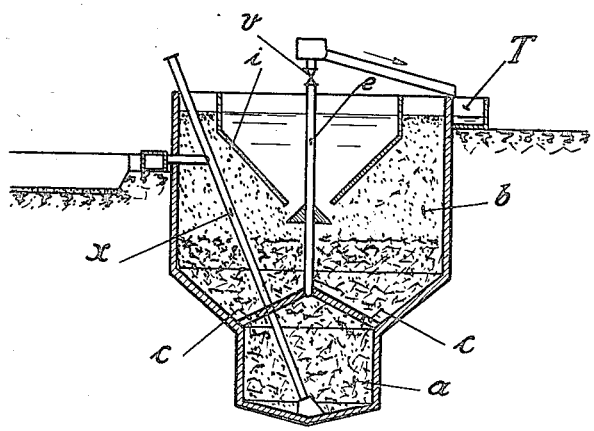
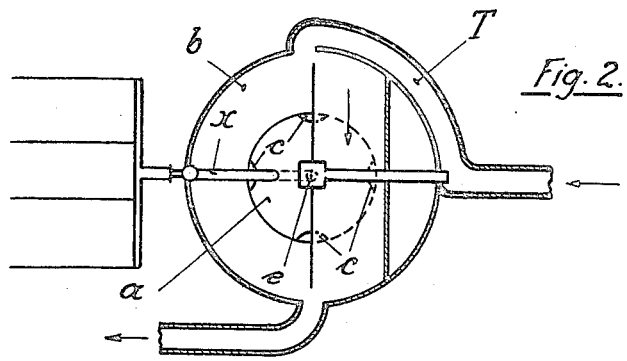
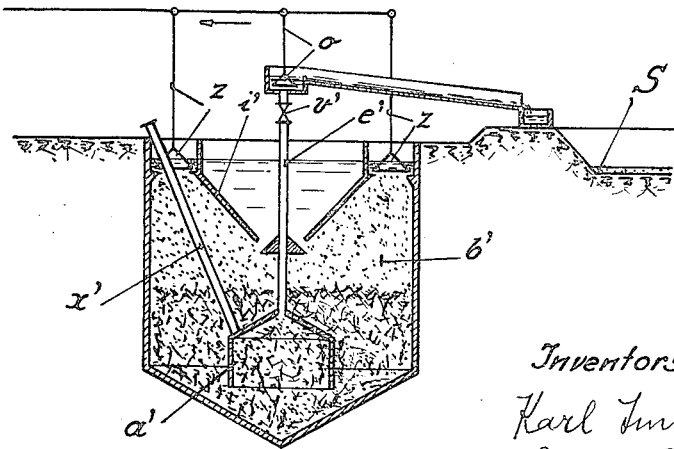

1,445,439

UNITED STATES PATENT OFFICE.

KARL IMHOFF AND HEINRICH BLUNK, OF ESSEN, GERMANY.

METHOD OF LETTING OFF SLUDGE FROM SLUDGE-DIGESTING TANKS.

Application filed April 13, 1922. Serial No. 552,334.

*To all whom it may concern:*

Be it known that we, KARL IMHOFF and HEINRICH BLUNK, citizens of the German Republic, and residing at Essen, Germany, have invented certain new and useful Improvements in a Method of Letting Off Sludge from Sludge-Digesting Tanks (for which we have filed application for patent in Germany on November 17th, 1921), of which the following is a specification.

In all sludge digesting tanks, a continuous agitation of the sludge takes place owing to the buoyancy of the digesting gases. Generally, the sludge supplied from up above into the tank is rich of water and poor of gas, while the sludge at the bottom of the tank is poorer of water and richer of gas. Due to said agitation, however, also fresh sludge portions, that are rich of water and poor of gas, pass to the deeper layers of the tank and are let-off together with the well-digested sludge if the sludge pipe issues as usual from the bottom of the tank.

If the sludge let-off from the digesting tank is for some time left to itself in a secondary sludge tank, the less digested sludge portions are quickly brought to the digesting ratio of the digested sludge. The ordinary constructions, however, in which the secondary tank for the re-digestion of the sludge lies separately beside the main tank, result in various drawbacks. Either, the sludge is pumped from one tank into the other, in which case it loses its gas contents essential for its drying and must form the same afresh in the secondary tank; or, the secondary tank has, like the main tank, above the bottom sludge a layer of water, so that also an agitation of the sludge is initiated and sludge portions, that are poor of gas and rich of water, are brought from the upper into the lower layers, so that the sludge left-off from the secondary tank is not of such a favourable quality as it ought to be.

Said drawbacks are avoided, according to the present invention, by directly inserting a secondary tank in the main tank to form a separate roofed chamber submerged therein, so that the sludge, before passing to the let-off pipe, is compelled to flow first from the main tank to said roofed chamber and is retained therein for some time completely separate from the remaining sludge in the main tank.

The accompanying drawing shows two appropriate constructional forms of the subject matter of the present invention:

Figs. 1 and 2 are respectively a perpendicular central section and a cross-section through one form, while—

Fig. 3 is a similar view to Fig. 1, of the other form.

The illustration shows Imhoff tanks, the waste-water being cleaned while flowing through settling basins $i$ (Fig. 1) or $i'$ (Fig. 3) with inclined partition-walls inserted in the tank.

The improved construction of the sludge digesting tank may, however, not only be applied to the sludge digesting chambers of Imhoff tanks, but also to any other digesting tanks such as, for instance, ordinary septic tanks or separate sludge digesting tanks that are completely separate from the settling basin.

In Fig. 1, the roofed chamber $a$ is arranged beneath the bottom of the sludge digesting tank $b$. The sludge passes through holes $c$ in the roof of said chamber from the bottom of the tank $b$ to the chamber $a$ and is drawn-off from the bottom of the latter through the sludge pipe $x$.

In Fig. 3, the roofed chamber $a'$ is arranged, like a diving-bell, in direct proximity to the bottom of the sludge digesting tank $b'$, so that the sludge enters said chamber from below, the sludge pipe $x'$ issuing from the roof of said chamber.

The gases produced in the roofed chamber can, besides, be utilized for raising the sludge from the sludge digesting tanks, for which purpose a perpendicular narrow rising-pipe $e$ (Fig. 1) or $e'$ (Fig. 3) issues from the highest point of the roof. The buoyancy of the gas bubbles ascending in said rising-pipe raises the sludge through the latter above water level, so that it can then be led with a natural fall either to highly situated sludge drying plants S (Fig. 3) or, for aiding in mixing the sludge and thus in digesting the same or in cleaning the waste-water, to the supply channel T of the Imhoff tank (Fig. 1).

Said rising-pipe can be closed above water level by means of a slide-valve $v$ (Fig. 1) or $v'$ (Fig. 3), which serves for shutting-off or throttling the supply of sludge through said pipe.

The gases ascending through the rising-pipe can be collected for further utilization (as indicated at $o$ in Fig. 3), like the other gases from the tank (as indicated at $z$ in Fig. 3).

What we claim, is:—

1. A method of letting-off sludge from sludge digesting tanks, consisting in retaining the sludge ready for being let-off, before its entering the let-off pipe, within a roofed chamber submerged in said tank, for some time separate from the other sludge in the tank, substantially as and for the purpose set forth.

2. A method of letting-off sludge from sludge digesting tanks, consisting in retaining the sludge ready for being let-off, before its entering the let-off pipe, within a roofed chamber submerged in said tank, for some time separate from the other sludge in the tank, and raising the sludge from said roofed chamber above water level in the tank by the buoyancy of its own gases, substantially as and for the purpose set forth.

3. A method of letting-off sludge from sludge digesting tanks, consisting in retaining the sludge ready for being let-off, before its entering the let-off pipe, within a roofed chamber submerged in said tank, for some time separate from the other sludge in the tank, raising the sludge from said roofed chamber above water level in the tank by the buoyancy of its own gases, and leading it to a sludge drying plant, substantially as and for the purpose set forth.

4. A method of letting-off sludge from sludge digesting tanks, consisting in retaining the sludge ready for being let-off, before its entering the let-off pipe, within a roofed chamber submerged in said tank, for some time separate from the other sludge in the tank, raising the sludge from said roofed chamber above water level in the tank by the buoyancy of its own gases, and leading it to the supply channel of an Imhoff tank, substantially as and for the purpose set forth.

In testimony whereof we have hereunto set our hands in the presence of two subscribing witnesses:

Dr. KARL IMHOFF.
HEINRICH BLUNK.

Witnesses:
Heinz W. Haas,
Albertine Porger.